United States Patent
Lacourcelle

(10) Patent No.: US 6,176,994 B1
(45) Date of Patent: Jan. 23, 2001

(54) METHOD AND DEVICE FOR MANUFACTURING A SPARK EROSION ELECTRODE WIRE

(75) Inventor: Louis Lacourcelle, Saint Jean de la Blaquiere (FR)

(73) Assignee: Thermocompact, societe anonyme, Metz Tessy (FR)

(*) Notice: Under 35 U.S.C. 154(b), the term of this patent shall be extended for 0 days.

(21) Appl. No.: 09/304,613

(22) Filed: May 4, 1999

(30) Foreign Application Priority Data

May 7, 1998 (FR) .................................................. 98-05990

(51) Int. Cl.[7] .............................. C25D 5/50; C25D 5/00; C23C 28/00; C23C 3/66
(52) U.S. Cl. .................... 205/102; 205/137; 205/232; 205/191; 205/228
(58) Field of Search .................... 205/228, 230, 205/231, 232, 137, 191, 102

(56) References Cited

U.S. PATENT DOCUMENTS

| | | | |
|---|---|---|---|
| 4,169,426 | 10/1979 | Kornmann et al. | 118/67 |
| 4,287,404 | 9/1981 | Convers et al. | 219/69 |
| 4,502,895 | * 3/1985 | Trubitsyn et al. | 148/518 |
| 5,118,572 | * 6/1992 | DeRobert et al. | 428/607 |
| 5,721,414 | * 2/1998 | Lacourcelle | 219/69.12 |
| 5,928,530 | * 7/1999 | Lacourcelle | 219/69.12 |
| 5,966,975 | * 10/1999 | Lacourcelle | 72/46 |

FOREIGN PATENT DOCUMENTS

| | | |
|---|---|---|
| 655 265 A5 | 4/1986 | (CH) . |
| 0 185 492 | 6/1986 | (EP) . |
| 0 811 701 A1 | 12/1997 | (EP) . |
| 2 418 699 | 9/1979 | (FR) . |
| 2 502 647 | 10/1982 | (FR) . |

* cited by examiner

Primary Examiner—Kathryn Gorgos
Assistant Examiner—Ihao Tran
(74) Attorney, Agent, or Firm—Ratner & Prestia

(57) ABSTRACT

A conductive electrode wire is passed through a molten salt bath maintained at a temperature above the melting point of the salts. A main electrical power supply passes an electric current between the electrode wire and an anode in the molten salt bath so that a metal coating layer is electrolytically deposited onto the core of the electrode wire. The high temperature of the molten salt bath ensures inter-diffusion of the metals of the core and the coating. This enables diverse coating structures to be obtained by choosing electrolysis and diffusion parameters.

21 Claims, 1 Drawing Sheet

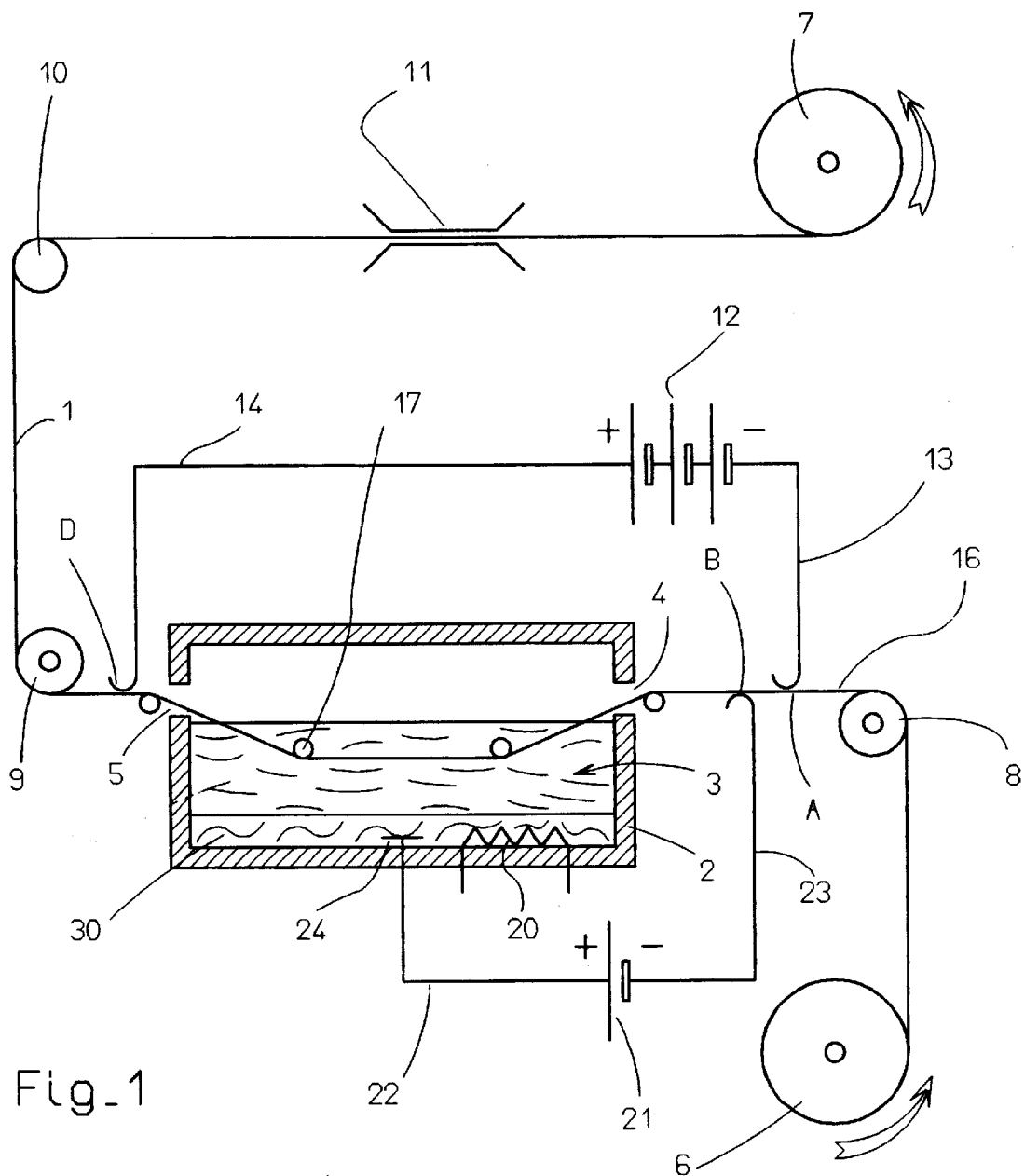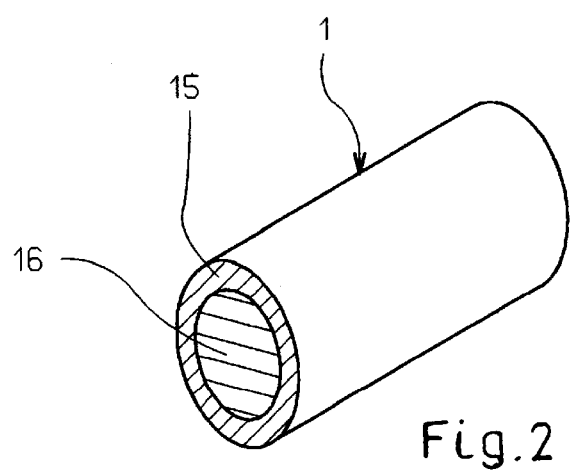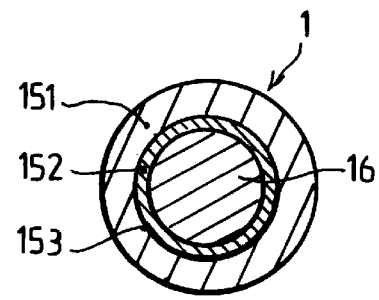
Fig_1
Fig.2
Fig_3

METHOD AND DEVICE FOR MANUFACTURING A SPARK EROSION ELECTRODE WIRE

BACKGROUND OF THE INVENTION

1. Field of the Invention

The present invention concerns wire electrodes used in machining metal parts by spark erosion.

2. Description of the Prior Art

In this type of machining, as described in document FR-A-2 418 699 for example, a wire electrode is driven in longitudinal translation and a portion of said wire is guided and stretched along a straight line segment displaced laterally along a path in the vicinity of a metal part to be machined. An electrical generator produces a potential difference between the part to be machined and the metal wire forming the electrode. Machining occurs in the machining area between the wire electrode and the metal part and progressively erodes the part and the wire.

Improvements to the quality of spark erosion electrode wire have been sought for a long time, combining good mechanical resistance to traction, good electrical conductivity of the wire and more regular production of the eroding sparks in the machining area between the electrode wire and the part to be machined.

For example, document U.S. Pat. No. 4,287,404 describes a method and device for making a spark erosion electrode wire having a wire core surrounded by a layer with a low boiling point, such as zinc, cadmium, tin, lead, antimony and bismuth. The outer metal layer is deposited by a step of cold electrolytic deposition from a bath of metal salt in aqueous solution, followed by a drawing step. A method of this kind has the drawback of producing electrode wire in which the outer layer vaporizes too quickly and provides insufficient protection of the core during spark erosion.

It has been found advantageous to heat the wire after electrolytic deposition of the surface layer of metal with a low boiling point, to form a diffused alloy, as taught in document EP-A-0 185 492. However, a process of this kind cannot be used to produce an electrode wire with a surface layer of diffused alloy in which the thickness and the structure are perfectly controlled.

Document U.S. Pat. No. 4,169,426 describes another method of producing a spark erosion electrode wire having a wire core surrounded by a metal layer, in which a conductive wire is passed continuously through a bath of molten metal and then quickly cooled to prevent intermetallic compounds forming at the interface between the wire core and the outer metal layer. The wire is then heat treated for several minutes at 320° C. before it is drawn to the required final diameter. A method of this kind also has the disadvantage that the thickness and the structure of the coating are not totally controlled.

Document CH-A-655 265 proposes preheating the conductive wire by the Joule effect by passing an appropriate electric current through it before it enters a bath of molten metal.

Document EP-A-0 811 701 teaches a similar method of producing spark erosion wire by passing the wire through a bath of molten metal, in which the wire is heated by the Joule effect while passing through the bath of molten metal. This method is no better than the previous ones in terms of controlling the thickness and structure of the coating.

During fabrication of a spark erosion electrode wire by any of the methods mentioned above, it is particularly difficult to adjust the quantity of deposited metal forming the coating, and above all the proportion of diffused metal, and consequently the nature of the alloy phases obtained. For example, in the method of document EP-A-0 185 492, thermal diffusion of the metals is very sensitive to the temperature of the wire and the heating time, and so obtaining a particular structure of the distribution of the metal concentrations in the coating requires very accurate control of the wire heating conditions during the diffusion step, which is difficult to achieve in an industrial process. What is more, it is not possible to obtain a wire structure having a surface layer of pure zinc covering an intermediate diffused brass layer in one simple operation.

The problem is that the coating of the spark erosion electrode wire must be sufficiently thick to constitute the wear layer when the wire is used for spark erosion machining and must have satisfactory properties suited to the machining conditions that will apply. A diffused brass layer having a β phase crystalline structure, favoring a higher speed of spark erosion, is desirable, in particular. However, obtaining the β phase layer is highly dependent on the temperature conditions during the diffusion step, and it is difficult to achieve consistent industrial production that is perfectly controlled.

Document FR-A-2 502 647 concerns a method of brass-plating metal parts such as a long wire for use in tire armatures. A thin (0.28 $\mu$) copper layer is deposited on an iron core, after which a zinc layer is applied electrolytically and the wire is heated to assure complete diffusion of the copper and the zinc, forming an α brass layer encouraging adhesion between the wire and the rubber of the tire. The coating obtained on the wire is too thin to be usable for spark erosion and the α brass is not suitable for spark erosion. The method employed would not be able to produce wire with a coating of sufficient thickness for spark erosion.

The problem addressed by the present invention is that of designing simple and inexpensive means for significantly enhancing the possibilities and the flexibility of manufacture of spark erosion electrode wires including at least one diffused alloy or metal layer around an electrically conductive wire core. To adapt the structure of the electrode wire to varying requirements it is necessary to be able to vary at will the concentration of metals in the various layers forming the coating and the thickness of the layers.

In an improvement on the invention, the aim is simultaneously to improve the adhesion of the metal or alloy layer to the core, to enable subsequent drawing of the wire without significant deterioration of the outer metal layer.

Another object of the invention is to provide a means of forming a metal or alloy layer of the above kind at will whose surface portion contains a high proportion of a metal with a low boiling point, such as zinc, cadmium, tin, lead, antimony or bismuth.

SUMMARY OF THE INVENTION

To achieve the above and other objects, the invention provides a method of manufacturing a spark erosion electrode wire having an electrically conductive wire core surrounded by a metal coating with a diffused area and adapted to constitute the wear area of the wire during spark erosion; this method includes at least one step of electrolysis of the electrode wire passing through an electrolysis bath consisting essentially of molten salts to deposit a metal or an alloy on an underlying layer of metal or alloy and simultaneously to bring about thermal diffusion in the diffused area between the deposit and the underlying layer.

The salts in the electrolysis bath are heated to a temperature above their melting point and the bath is referred to in the remainder of the description and in the claims as a "molten salt bath".

Accordingly, unlike prior art electrolytic methods of producing spark erosion electrode wires, electrolysis is effected not in a bath of metal salts in aqueous solution, but instead in a bath of one or more metal salts maintained at a temperature higher than their melting point.

The molten salt bath contains at least one salt of a metal which is part of the composition of the metal coating.

In one advantageous embodiment of the invention the molten salt bath contains a zinc salt.

Good results are obtained using a molten salt bath containing at least one metal salt from the family of chlorides, iodides, bromides and sulfates.

At least one alkaline metal or alkali earth salt such as sodium chloride, potassium chloride, lithium chloride, can advantageously be added to the molten salt bath, its presence reducing the melting point of the molten salt bath and improving the electrical conductivity of the bath. This enables increasing the range of possible variation in the temperature to low temperatures, and thus increasing the range of possible variation in the rate of the thermal diffusion in the diffused area between the deposit and the underlying layer.

In practice, the molten metal salt electrolysis bath can advantageously be in contact with a mass of metal formed of the metal(s) of the salts. The mass of metal constitutes the anode or positive pole and the electrically conductive wire core passes continuously through the molten salt bath and constitutes the cathode or negative pole.

The mass of metal forming the anode can be solid. Alternatively, the mass of metal forming the anode can be molten and in contact with a solid electrode, for example a graphite electrode that provides the positive pole.

The invention exploits the independent nature of the parameters controlling the rate of deposition of metal by electrolysis and the rate of thermal diffusion in the diffused area. Accordingly, during the electrolysis step, the electrolysis current density, the electrolysis bath temperature and the time the electrode wire spends in the electrolysis bath constitute parameters that are varied to obtain the required structure of the metal coating.

According to a possible method, the electrolysis current density and the electrolysis bath temperature can advantageously be chosen so that the rate of deposition of the metal or alloy is greater than the rate of thermal diffusion, so that the surface area of the electrode wire is formed of a non-diffused and homogeneous metal or alloy deposit covering a diffusion area from which it is separated by a clear interface.

In this case, it may be considered that the time for which the electrode wire remains in the electrolysis bath is relatively short, so that diffusion of the metal or alloy of the deposit is incomplete. When choosing a short time for which the electrode wire remains in the electrolysis bath, it is possible to make, through only one step according to the invention, an electrode wire for spark erosion having a relatively thick outer layer of non-diffused metal or alloy, covering a thinner diffused layer.

The electrolysis current density and the electrolysis bath temperature can instead be chosen so that the rate of deposition of the metal or alloy is less than the rate of thermal diffusion, so that the surface area of the electrode wire is formed of diffused metal or alloy. In this case, it may be considered that the time for which the electrode wire remains in the electrolysis bath is relatively long, so that diffusion of the metal or alloy of the deposit is complete.

For good adaptation to the conditions encountered in spark erosion machining, the metal or alloy can advantageously be deposited in sufficient quantity for the coating in the final electrode wire to have a thickness of several microns.

For example, the deposited metal can be zinc and the underlying layer can be copper or copper alloy.

In an advantageous embodiment of the invention, the wire core is further heated by the Joule effect while it is passing through the molten salt bath by passing an appropriate electric current through the portion of the wire core passing through the molten salt bath.

In one embodiment of the invention, a device for manufacturing a spark erosion electrode wire having an electrically conductive wire core surrounded by a metal coating comprises:

a container adapted to contain an electrolysis bath essentially composed of molten salts and to enable the wire core to pass continuously through the molten salt bath, means for guiding and driving the wire core and then the electrode wire through the molten salt bath, a main electrical power supply the negative terminal of which is electrically connected to the wire core or to the electrode wire outside the molten salt bath and the positive terminal of which is electrically connected to a conductive anode in contact with the molten salt bath to pass an appropriate electrical current into the molten salt bath between the anode and the wire core as it moves through the molten salt bath in order to deposit metal or alloy electrolytically on the wire core.

For example, the container may contain a liquid top layer formed of at least one molten metal salt on top of a liquid or solid bottom layer formed of said metal.

In an advantageous embodiment of the invention, conductors are respectively in contact with the wire core upstream of the container and with the electrode wire downstream of the container and are connected to an auxiliary electrical power supply to pass through the wire core an auxiliary electrical current providing additional heating by the Joule effect, in particular while it is passing through the molten salt bath.

In accordance with the invention, using electrolysis in a molten salt bath, by choosing the electrolysis current it is possible to adjust the rate of deposition of metal coating onto the electrically conductive core within a wide range. Although in electrolysis in a metal salt bath in aqueous solution the electrolysis current density is less than around 100 amperes per square decimeter, electrolysis in a molten salt bath enables the use of much higher current densities. The higher current densities widen the range of possible variation in the rate of deposition of metal.

Simultaneously, by virtue of the high temperature of the electrolysis bath and the resulting heating of the wire, the method allows simultaneously thermal inter-diffusion of the metals constituting the metal layer and the core, when these metals are appropriately chosen. For example, the method enables simultaneous deposition of a layer of zinc onto a copper or copper alloy core and diffusion of the zinc and the copper into each other. The rate of diffusion can be varied by the independent choice of the temperature of the molten salt bath.

If required, the electrolytic method can deposit metal at a rate higher than the rate of thermal diffusion of the metal in the metal layer into the electrically conductive core, for example in order to increase the concentration of a particular metal, such as zinc, in the surface layer of the electrode wire.

The invention allows the quantity of metal deposited to be varied at will and independent and reliable control of the proportion and depth of the diffused metal.

Other objects, features and advantages of the present invention will emerge from the following description of particular embodiments of the invention given with reference to the accompanying drawings.

BRIEF DESCRIPTION OF THE DRAWINGS

FIG. 1 is a diagrammatic representation of one embodiment of a device in accordance with the present invention for producing spark erosion electrode wire.

FIG. 2 is a perspective view showing a portion of spark erosion electrode wire in accordance with the invention.

FIG. 3 is a cross section of a spark erosion electrode wire according to a particular embodiment of the invention.

DETAILED DESCRIPTION OF THE PREFERRED EMBODIMENTS

In the embodiment shown in FIG. 1, a device in accordance with the invention for producing a spark erosion electrode wire 1 includes a container 2 adapted to contain a molten salt bath 3 containing one or more metal salts. Heating means such as an electric element 20 connected to an external electrical power supply maintain the electrolysis bath at an appropriate temperature to keep the metal salt(s) molten during manufacture of the electrode wire 1. The container 2 has an inlet orifice 4 and an outlet orifice 5 so that a conductive wire core 16 can pass continuously through the molten salt bath 3.

Wire guide and feed means guide the wire core 16 and then the electrode wire 1 and feed them in continuous longitudinal translation through the molten salt bath 3. The wire core 16 is paid out from an upstream spool 6, for example, passes around one or more pulleys 8, and passes through the molten salt bath 3 between the inlet orifice 4 and the outlet orifice 5 of the container 2 in appropriate guides 17. In the molten salt bath 3 the wire core 16 receives a layer of deposited metal and becomes an electrode wire 1. After leaving the container 2 via the outlet 5, the electrode wire 1 is guided by pulleys 9 and 10 to a downstream spool 7 on which it is taken up.

The device may further include one or more dies 11 for drawing the electrode wire 1 to increase its length and set its dimensions after passing through the container 2 and before it is wound onto the downstream spool 7.

The device in accordance with the invention further includes a main electrical power supply 21 the negative terminal of which is electrically connected by a first conductor 23 to the wire core 16 or to the electrode wire 1 at a point B outside the molten salt bath 3, for example to the wire core 16 on the upstream side, as shown in FIG. 1, and whose positive terminal is electrically connected by a second conductor 22 to the molten salt bath 3. The second conductor 22 is electrically connected to an electrode 24 inside the container 2 to feed the electrical current into the molten salt bath 3, for example.

In a first embodiment, the container 2 contains a mass 30 of one or more molten metals in contact with the molten salt bath 3. The electrode 24, which provides the positive pole, can be made of graphite, for example, and is advantageously inside the mass 30 of molten metal. The metals of the mass 30 of molten metal are advantageously the same as the metals of the metal salts in the molten salt bath 3. In this case, the container 2 contains a bath 3 of salts of one or more molten metals in contact with a mass 30 of said molten metals.

In this first embodiment, the temperature of the molten salt bath 3 is higher than the melting point of the metals constituting the mass 30 of molten metals, but must be less than the melting point of the wire core 16 of the wire. The mass 30 of molten metal constitutes the anode in contact with the molten salt bath 3. The relatively high temperature of the molten salt bath 3, from about 250° C. to about 700° C. for example, assures at least partial diffusion into the wire core 16 of the metal(s) electrolytically deposited onto the wire core 16.

In a second embodiment of the invention, the temperature of the molten salt bath 3 is below the melting point of the metal(s) to be deposited and the electrode 24 advantageously consists of said metal(s) to be deposited, in the solid state. The electrode 24 then of itself constitutes the anode, in contact with the molten salt bath 3. The rate of diffusion will be lower than in the previous embodiment. However, the mass of metal deposited on the wire core 16 can advantageously be divided between a diffused intermediate layer and a surface layer of non-diffused metal(s).

The main power supply 21 passes an appropriate electric current through the molten salt bath 3 between the anode and the wire core 16 as it passes through the molten salt bath 3 to deposit metal electrolytically onto the wire core 16.

The output current of the main electrical power supply 21, the temperature of the molten salt bath 3 and the time for which the wire remains in the molten salt bath 3 determine the structure of the spark erosion electrode wire 1.

In an advantageous embodiment of the invention, the device also includes an auxiliary electrical power supply 12 connected to conductors 13 and 14 respectively in contact with the wire core 16 at a contact point A upstream of the container 2 and with the electrode wire 1 at a contact point D downstream of the container 2. The auxiliary electrical power supply 12 passes an appropriate auxiliary electrical current through the wire core 16 as it passes through the molten salt bath 3 and the wire core 16 is further heated by the Joule effect.

The additional heating of the wire core 16 by the Joule effect preferably heats the wire to a sufficiently high temperature to prevent fragile alloy phases forming on the surface of the metal coating 15. For example, in the case of a copper wire coated with zinc, the formation of $\gamma$, $\delta$ or $\epsilon$ phases can be prevented.

The appropriate auxiliary electrical current can advantageously be such that the wire core 16 is heated substantially to red heat as it passes through the molten salt bath 3.

In a first embodiment of the invention, the upstream contact point A is in the immediate vicinity of the inlet orifice 4 of the container 2 and the downstream contact point D is in the immediate vicinity of the outlet orifice 5 of the container 2. In this case, the additional heating of the wire core 16 by the Joule effect occurs only in the portion of the core passing through the container 2 containing the molten salt bath 3.

As an alternative to this, the downstream contact point D can be moved away from the outlet orifice 5 of the container 2, so that heating of the electrode wire 1 by the Joule effect continues after it leaves the molten salt bath 3. The electrode wire 1 can be heated for a sufficient time period after it leaves the molten salt bath 3 to bring about inter-diffusion of the deposited metal and the metal of the wire core 16.

The wire core 16 can advantageously be pre-heated by the Joule effect by moving the upstream contact point A away from the inlet orifice 4. The auxiliary electrical current then flows in a portion of the wire core 16 upstream of the molten salt bath 3.

The device from FIG. 1 operates as follows: a wire core 16 wound on the upstream spool 6 and constituting the future core of the electrode wire 1 is paid out from the upstream spool 6, passes over the first pulley 8 and then passes through the container 2, which it enters via the inlet orifice 4 and leaves via the outlet orifice 5 in the form of an electrode wire 1 guided by the pulleys 9 and 10 to pass through a die 11 and then be taken up onto the downstream spool 7. The molten salt bath 3 in the container 2 through which the wire core 16 passes contains one or more molten metal salts and is maintained by the electrical heating element 20 at a temperature above the melting point of the salts. The current from the main electrical power supply 21 causes electrolysis of the molten metal salt(s) in the container 2 so that the metal(s) of the molten metal salt(s) are deposited onto the wire core 16, producing an electrode wire 1 with a metal coating 15 around a wire core 16, as shown in FIG. 2.

In the case of a wire core 16 of a metal such as copper or copper alloy, for example, and in the case of depositing a metal such as zinc in the metal coating 15, because of the high temperature of the molten salt bath 3, inter-diffusion of the metal(s) of the metal coating 15 and the metal(s) of the wire core 16 occurs at the interface between the metal coating 15 and the core 16, constituting an intermediate area of a diffused alloy, for example brass, or constituting a fully diffused coating 15.

In the example shown in FIG. 1, while it is passing through the container 2 containing the molten salt bath 3, the wire core 16 also carries the auxiliary current produced by the auxiliary electrical power supply 12, which causes additional heating of the electrode wire 1 or the wire core 16 by the Joule effect. This additional heating speeds up diffusion of metal between the metal coating 15 and the wire core 16 and/or improves adhesion of the metal coating 15 to the wire core 16.

Clearly the method of the invention consists in providing at least one step of electrolytic deposition of metal or alloy onto a wire core 16 by passing it through a molten salt bath 3. There may equally be provision for the successive deposition of a plurality of layers of identical or different metals or alloys onto the same wire core 16.

The electrode wire 1 obtained by a method in accordance with the invention can have a coating 15 with a layer of zinc on top of an intermediate layer of diffused zinc alloy at the interface with a copper or copper alloy core 16, for example. The intermediate layer is a layer of copper and zinc alloy obtained through thermal diffusion.

In the example of FIG. 2, the coating 15 has only one layer, either in a fully diffused alloy or in a thick non-diffused zinc layer covering an intermediate zinc diffused layer with a thickness very small or insignificant.

In the example of FIG. 3, the coating 15 comprises a non-diffused zinc layer 151 covering an intermediate diffused zinc layer 152, with a clear interface 153.

A spark erosion electrode wire of the above kind has excellent properties that were not readily obtainable with prior art manufacturing methods: the diffused brass intermediate layer 152 increases the speed of spark erosion machining and the surface layer 151 of non-diffused zinc provides a better surface finish on the part machined by spark erosion. As an example, such an electrode wire may be obtained electrolytically in a bath of zinc chloride and potassium chloride in equal molar concentrations, maintained at a temperature of about 450° C., by adapting the time during which the wire core passes through the electrolysis bath and adapting the electrolysis electrical current according to the thickness of the zinc layer and of the diffused layer to be obtained.

Alternatively, a core 16 of iron, aluminum or some other metal can be provided, with a coating 15 including a layer of copper or copper alloy or other metal or alloy, which is a good conductor of electricity, and a fully or partly diffused surface layer based on a metal with a low boiling point such as zinc, cadmium, tin, lead, antimony or bismuth.

The present invention is not limited to the embodiments that have been explicitly described but includes variants and generalizations thereof within the scope of the following claims.

There is claimed:

1. A method of manufacturing an electrode wire for spark erosion having an electrically conductive wire core surrounded by a metal coating with a diffused area and adapted to constitute the wear area of said wire during spark erosion, said method including at least one step of electrolysis of said electrode wire passing through an electrolysis bath consisting essentially of molten salts, to bring about simultaneously deposition of metal or alloy on an underlying layer of metal or alloy and thermal diffusion in said diffused area between said deposit and said underlying layer, wherein said metal coating of said spark erosion electrode wire comprises brass having a β-phase crystalline structure.

2. The method claimed in claim 1 wherein said metal or alloy is deposited in sufficient quantity for said coating to have a thickness of several microns in the final electrode wire.

3. The method claimed in claim 1 wherein the deposited metal is zinc and said underlying layer is copper or copper alloy.

4. The method claimed in claim 1 wherein the bath of molten salts contains at least one alkaline metal or alkali earth salt.

5. The method claimed in claim 1 wherein, while it is passing through said molten salt bath, the heating of said wire core is increased by the Joule effect by passing an appropriate auxiliary electrical current through the portion of said wire core passing through said molten salt bath.

6. The method claimed in claim 1 wherein, during said electrolysis step, the electrolysis current density, the temperature of said electrolysis bath and the time for which said electrode wire remains in said electrolysis bath are varied to obtain the required structure of said metal coating.

7. The method claimed in claim 6 wherein said electrolysis current density and said temperature of said electrolysis bath are chosen so that the rate of deposition of said metal or alloy is greater than the rate of thermal diffusion so that the surface of said electrode wire is formed of non-diffused deposited metal or alloy outer layer covering a diffusion area.

8. The method claimed in claim 7 wherein said time for which said electrode wire remains in said electrolysis bath is short so that said outer layer of non-diffused metal or alloy is relatively thick and covers a thinner diffused layer.

9. The method claimed in claim 6 wherein said electrolysis current density and said temperature of said electrolysis bath are chosen so that the rate of deposition of said metal or alloy is less than the rate of thermal diffusion so that the surface of said electrode wire is formed of diffused metal or alloy.

10. A method of manufacturing an electrode wire for spark erosion having an electrically conductive wire core surrounded by a metal coating with a diffused area and adapted to constitute the wear area of said wire during spark erosion, said method including at least one step of electrolysis of said electrode wire passing through an electrolysis bath consisting essentially of molten salts, to bring about simultaneously deposition of metal or alloy on an underlying layer of metal or alloy and thermal diffusion in said diffused area between said deposit and said underlying layer, wherein while said electrode wire is passing through said molten salt bath, the heating of said wire core is increased by the Joule effect by passing an appropriate auxiliary electrical current through the portion of said wire core passing through said molten salt bath.

11. The method as recited in claim 10, wherein said wire is heated to red heat.

12. The method as recited in claim 10, wherein an upstream contact point is located upstream from an electrolysis bath inlet hole, and a downstream contact point is located downstream from an electrolysis bath outlet hole such that the Joule effect occurs only in the portion of the core located between said contact points.

13. The method as recited in claim 10, wherein an upstream contact point is located at an electrolysis bath inlet hole, and a downstream contact point is located downstream from an electrolysis bath outlet hole such that the Joule effect occurs only in the portion of the core located between said contact points.

14. The method as recited in claim 10, wherein an upstream contact point is located upstream from an electrolysis bath inlet hole, and a downstream contact point is located at an electrolysis bath outlet hole such that the Joule effect occurs only in the portion of the core located between said contact points.

15. The method as recited in claim 10, wherein an upstream contact point is located at an electrolysis bath inlet hole, and a downstream contact point is located at an electrolysis bath outlet hole such that the Joule effect occurs only in the portion of the core located between said contact points.

16. The method as recited in claim 10, wherein during said electrolysis step, the electrolysis current density and the temperature of said electrolysis bath are chosen so that the rate of deposition of said metal or alloy is greater than the rate of thermal diffusion so that the surface of said electrode wire is formed of non-diffused deposited material or alloy outer layer covering a diffusion area.

17. The method as recited in claim 10 wherein said time for which said electrode wire remains in said electrolysis bath is short so that said outer layer of non-diffused metal or alloy is relatively thick and covers a thinner diffused layer.

18. The method as recited in claim 10 wherein said electrolysis current density and said temperature of said electrolysis bath are chosen so that the rate of deposition of said metal or alloy is less than the rate of thermal diffusion so that the surface of said electrode wire is formed of diffused metal or alloy.

19. The method as recited in claim 10 wherein said metal or alloy is deposited in sufficient quantity for said coating to have a thickness of several microns in the final electrode wire.

20. The method as recited in claim 10 wherein the deposited metal is zinc and said underlying layer is copper or copper alloy.

21. The method as recited in claim 10 wherein the bath of molten salts contains at least one alkaline metal or alkali earth salt.

* * * * *